United States Patent
Du

(10) Patent No.: US 10,185,193 B2
(45) Date of Patent: Jan. 22, 2019

(54) LIQUID CRYSTAL PIXEL STRUCTURE AND LIQUID CRYSTAL DISPLAY

(71) Applicant: SHENZHEN CHINA STAR OPTOELECTRONICS TECHNOLOGY CO., LTD., Guangdong (CN)

(72) Inventor: Peng Du, Guangdong (CN)

(73) Assignee: SHENZHEN CHINA STAR OPTOELECTRONICS TECHNOLOGY CO., LTD (CN)

( * ) Notice: Subject to any disclaimer, the term of this patent is extended or adjusted under 35 U.S.C. 154(b) by 60 days.

(21) Appl. No.: 15/313,131

(22) PCT Filed: Jul. 12, 2016

(86) PCT No.: PCT/CN2016/089715
§ 371 (c)(1),
(2) Date: Nov. 22, 2016

(87) PCT Pub. No.: WO2017/219398
PCT Pub. Date: Dec. 28, 2017

(65) Prior Publication Data
US 2017/0371212 A1 Dec. 28, 2017

(30) Foreign Application Priority Data
Jun. 22, 2016 (CN) .......................... 2016 1 0458469

(51) Int. Cl.
G02F 1/1362 (2006.01)
G02F 1/1337 (2006.01)
G02F 1/1343 (2006.01)

(52) U.S. Cl.
CPC .. *G02F 1/136286* (2013.01); *G02F 1/133753* (2013.01); *G02F 2001/134345* (2013.01); *G02F 2201/40* (2013.01)

(58) Field of Classification Search
CPC .................................................. G02F 1/134309
See application file for complete search history.

(56) References Cited

U.S. PATENT DOCUMENTS

| 6,839,117 B1 | 1/2005 | Park et al. |
| 2008/0036932 A1 | 2/2008 | Lee |

(Continued)

FOREIGN PATENT DOCUMENTS

| CN | 101398587 | 1/2009 |
| CN | 202339463 | 7/2012 |

(Continued)

OTHER PUBLICATIONS

International Search Report dated Mar. 22, 2017 for Corresponding PCT App. No. PCT/CN2016/089715.

*Primary Examiner* — Edmond Lau
(74) *Attorney, Agent, or Firm* — Emerson, Thomson & Bennett, LLC; Roger D. Emerson

(57) ABSTRACT

A liquid crystal pixel structure is disclosed. The liquid crystal pixel structure includes: a pixel electrode, located in a pixel aperture. The pixel electrode has two or more display domains applied with the same voltage level. The pixel electrode extends in different directions in the display domains. A gate line is located at an intersection of the display domains. An edge of the intersection of the display domains overlaps the gate line. A data line is located at an edge of the pixel aperture. The pixel electrode is controlled by the gate line and the data line via a transistor. The aperture of the pixel structure is divided by the gate lines. Therefore, the edge of the display domains overlaps the gate lines. The dark line can be covered by the gate lines and thus the aperture rate and the transparent rate can be raised.

2 Claims, 4 Drawing Sheets

(56) References Cited

U.S. PATENT DOCUMENTS

2012/0050656 A1* 3/2012 Liu ................ G02F 1/1343
                                                          349/139
2016/0170273 A1* 6/2016 Lee ............... G02F 1/134309
                                                           349/43
2017/0123219 A1* 5/2017 Jin ................ G02B 27/2214

FOREIGN PATENT DOCUMENTS

| CN | 104932162 | 7/2015 |
|----|-----------|--------|
| KR | 20130059181 | 6/2013 |
| KR | 20130071928 | 7/2013 |

\* cited by examiner

LIQUID CRYSTAL PIXEL STRUCTURE AND LIQUID CRYSTAL DISPLAY

BACKGROUND OF THE INVENTION

1. Field of the Invention

The invention relates to a liquid crystal display, and more particularly, to a pixel structure and a liquid crystal display capable of raising an aperture rate and a transparent rate.

2. Description of the Prior Art

Thin-Film Transistor-Liquid Crystal Display (TFT-LCD) is a widely-used display. In the LCD design, in order to obtain a wider viewing angle, the pixel aperture may be divided into multiple domains to avoid that the screen becomes blue or yellow if only one domain is viewed from its side. In today's LCD panel, Fringe Field Switching (EFS)/In-Plane Switching (IPS) LCD panels are widely used because of the large viewing angle and high aperture rate/transparent rate.

Please refer to FIG. 1, which is a diagram of a conventional EFS LCD panel pixel structure. The display EFS LCD panel 10 comprises a plurality of gate lines G1 extending horizontally and a plurality of data lines D1 extending vertically. The gate lines G1 and the data lines D1 intersect each other and thus define a plurality of pixel areas. The aperture 12 of each pixel area comprises a pixel electrode P1. The aperture 12 can be divided into an upper display domain ($1^{st}$ domain) and a lower domain ($2^{nd}$ domain). In other words, the pixel electrode comprises two display domains. The data lines D1 are arranged at the edge of the aperture 12 (as shown in FIG. 1, the data lines D1 are located at the left side of the aperture 12). The display domains ($1^{st}$ domain and $2^{nd}$ domain) of the pixel electrode P1 are located at the same side of the gate lines G1 (as shown in FIG. 1, $1^{st}$ and $2^{nd}$ domains are located in upper of the gate lines G1). The TFT transistor T1 is used as a switch for receiving a control signal to control the pixel electrode P1. In addition, the extending directions of the pixel electrode P1 in the display domains ($1^{st}$ and $2^{nd}$ domains) are different. The liquid crystal molecules located at the display domains respectively rotate clockwise and counterclockwise. The above-mentioned characteristic is used to improve the large view angle performance of the EFS LCD panel. However, at the intersection 14 (the region marked by the dotted line) of the two display domains ($1^{st}$ and $2^{nd}$ domains), the liquid crystal molecules rotates in different direction. Therefore, when the LCD works, the liquid crystal molecules, rotating in different direction, push each other and thus form a dark line in the aperture 12. This dark line ruins the transparent rate and makes it difficult to raise the aperture rate and the transparent rate.

Please refer to FIG. 2, which is a diagram of a pixel structure of a conventional High-Vertical Alignment (HVA) LCD 20. Similarly, the LCD 20 comprises a plurality of gate lines G1 extending horizontally and a plurality of data lines D1 extending vertically. The gate lines G1 and the data lines D1 intersect and thus define a plurality of pixel areas. The aperture 22 of each pixel area comprises a pixel electrode P1. The pixel electrode P1 has horizontal trunk and a vertical trunk intersected each other. The horizontal trunk and the vertical trunk divide the pixel electrode P1 into four display domains (that is, the aperture 22 is divided into 4 display domains, $1^{st}$-$4^{th}$ domains). The data lines D1 are arranged at the edge of the aperture 22 (as shown in FIG. 2, the data lines D1 are located at the left side of the aperture 22). The four display domains ($1^{st}$-$4^{th}$ domains) are located at the same side of the gate lines G1 (as shown in FIG. 2, $1^{st}$-$4^{th}$ domains are located in upper of the gate lines G1). The TFT transistor T1 is arranged on the common electrode COM1 and used as a switch to control the pixel electrode P1. In addition, the liquid crystal molecules located at the four display domains respectively rotate 45 degrees, 135 degrees, 225 degrees, and 315 degrees. The above-mentioned characteristic is used to improve the large view angle performance of the HVA LCD panel. However, similarly, at the trunks (for example, the portions 24 and 26 marked by the dotted lines) of the four display domains ($1^{st}$ and $2^{nd}$ domains), the liquid crystal molecules rotates in different direction. Therefore, when the LCD works, the liquid crystal molecules, rotating in different direction, push each other and thus form dark lines in the aperture 22. The dark lines ruin the transparent rate and make it difficult to raise the aperture rate and the transparent rate.

Therefore, a novel LCD pixel structure is needed to raise the aperture rate and transparent rate such that the display quality can be raised.

SUMMARY OF THE INVENTION

It is therefore one of the primary objectives of the claimed invention to provide a pixel structure and a LCD to raise the aperture rate and the transparent rate such that the display quality can be raised as well.

According to an exemplary embodiment of the claimed invention, a liquid crystal pixel structure is disclosed. The liquid crystal includes: a pixel electrode, located in a pixel aperture, the pixel electrode comprising at least two vertically-arranged display domains, the at least two display domains have a same voltage level, the pixel electrode extends in different directions in the at least two display domains; a gate line, located at an intersection of the at least two display domains, and an edge of the intersection of the at least two display domains overlaps the gate line; a data line, located at an edge of the pixel aperture; and a transistor, wherein the pixel electrode is controlled by the gate line and the data line via the transistor.

According to an exemplary embodiment of the claimed invention, a liquid crystal display (LCD) is disclosed. The LCD includes: a plurality of gate lines extending in a horizontal direction; and a plurality of data lines extending in a vertical direction; wherein the plurality of gate lines and the plurality of data lines define a plurality of pixel areas and each of the pixel areas comprises the aforementioned liquid crystal pixel structure.

According to an exemplary embodiment of the claimed invention, a liquid crystal pixel structure is disclosed. The pixel structure includes: a pixel electrode, located in a pixel aperture, the pixel electrode comprising at least four display domains, wherein a first display domain and a second display domain of the at least four display domains are horizontally arranged, a third display domain and a fourth display domain of the at least four display domains are horizontally arranged, and the at least four display domains have a same voltage level; a gate line, wherein the first display domain and the second display domain are arranged above the gate line, an lower edge of the first display domain and the second display domain overlaps the gate line, the third display domain and the fourth display domain are arranged under the gate line, and an upper edge of the third display domain and the fourth display domain overlaps the gate line; a data line, located at an edge of the pixel aperture; and a transistor, wherein the pixel electrode is controlled by the gate line and the data line via the transistor; wherein liquid crystal molecules of the first display domain, the second display domain, the third display domain, the fourth display domain respectively rotate 45 degrees, 135 degrees, 225 degrees, and 315 degrees from the data line.

According to an exemplary embodiment of the claimed invention, a liquid crystal display (LCD) is disclosed. The LCD includes: a plurality of gate lines extending in a horizontal direction; and a plurality of data lines extending in a vertical direction; wherein the plurality of gate lines and the plurality of data lines define a plurality of pixel areas and each of the pixel areas comprises the aforementioned liquid crystal pixel structure.

In contrast to the related art, the aperture of the pixel structure according to an exemplary embodiment is divided by the gate lines. Therefore, the edge (the dividing lines of the aperture of the pixel) of the display domains overlaps the gate lines. Because the gate lines are made by non-transparent metal material, the overlapping areas of the gate lines and the edges of the display domains do not affect the aperture rate and the transparent rate. In other words, the dark line caused by the liquid crystal molecules rotating differently can be covered by the gate lines and thus the aperture rate and the transparent rate can be raised. Furthermore, because the region where the liquid crystal molecules rotating differently are covered by the gate lines, there would be no display error when the LCD panel is pushed. This also raises the display quality. In addition, the area between two adjacent pixels can be blank area or can be occupied by the common line COM. This improves the aperture rate and the flexibility of the layouts. Furthermore, the pixel structure and the LCD according to an exemplary embodiment can be used in FFS/IPS LCD or HVA LCD.

DETAILED DESCRIPTION OF THE PREFERRED EMBODIMENT

These and other objectives of the claimed invention will no doubt become obvious to those of ordinary skill in the art after reading the following detailed description of the preferred embodiment that is illustrated in the various figures and drawings.

Figure 1:
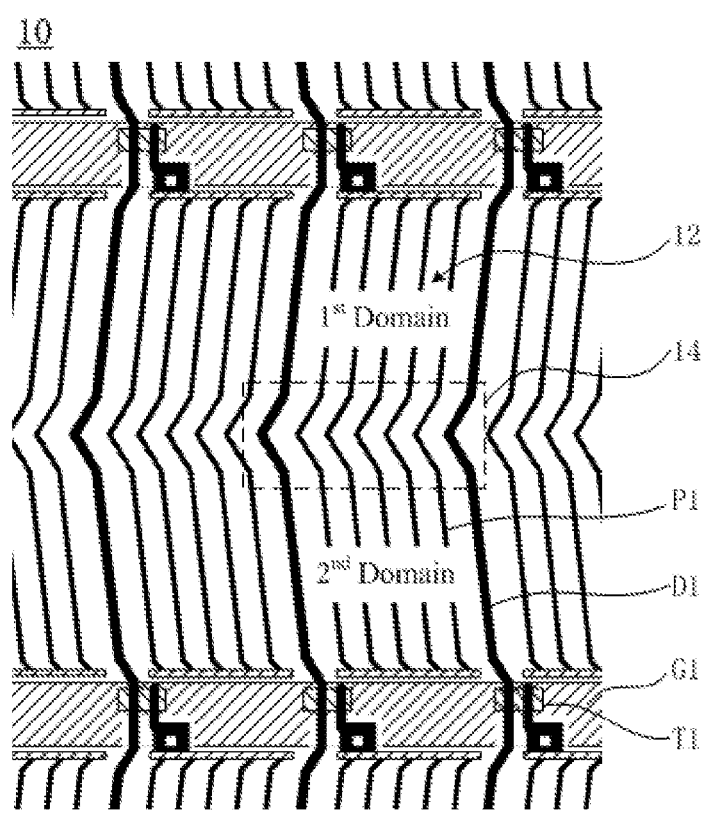
FIG. 1 is a diagram of a pixel structure of a conventional FFS LCD.
Figure 2:
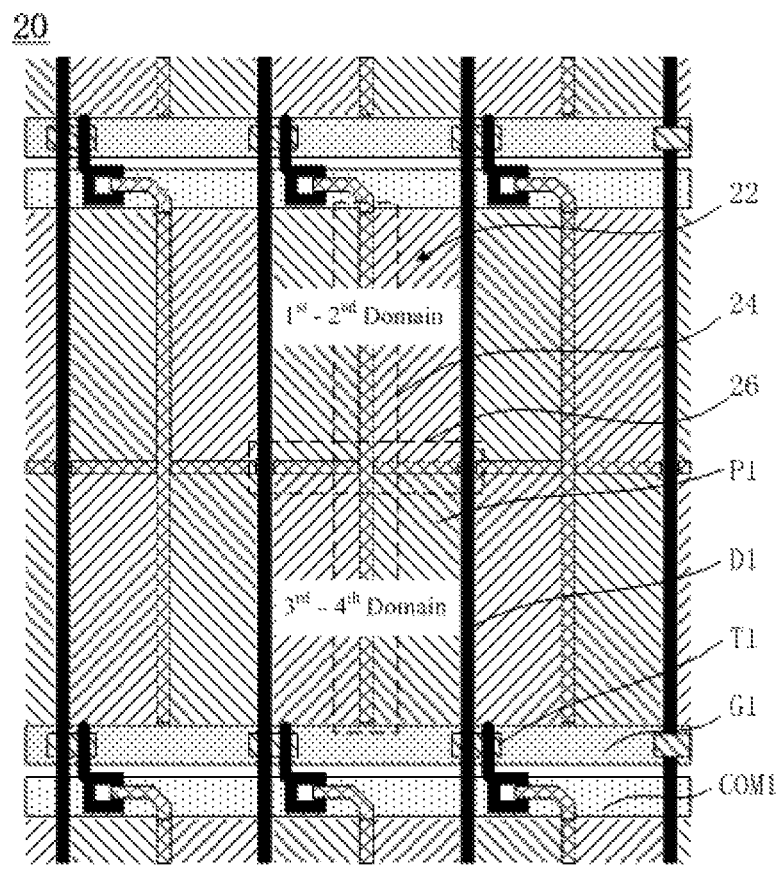
FIG. 2 is a diagram of a pixel structure of a conventional HVA LCD.
Figure 3:
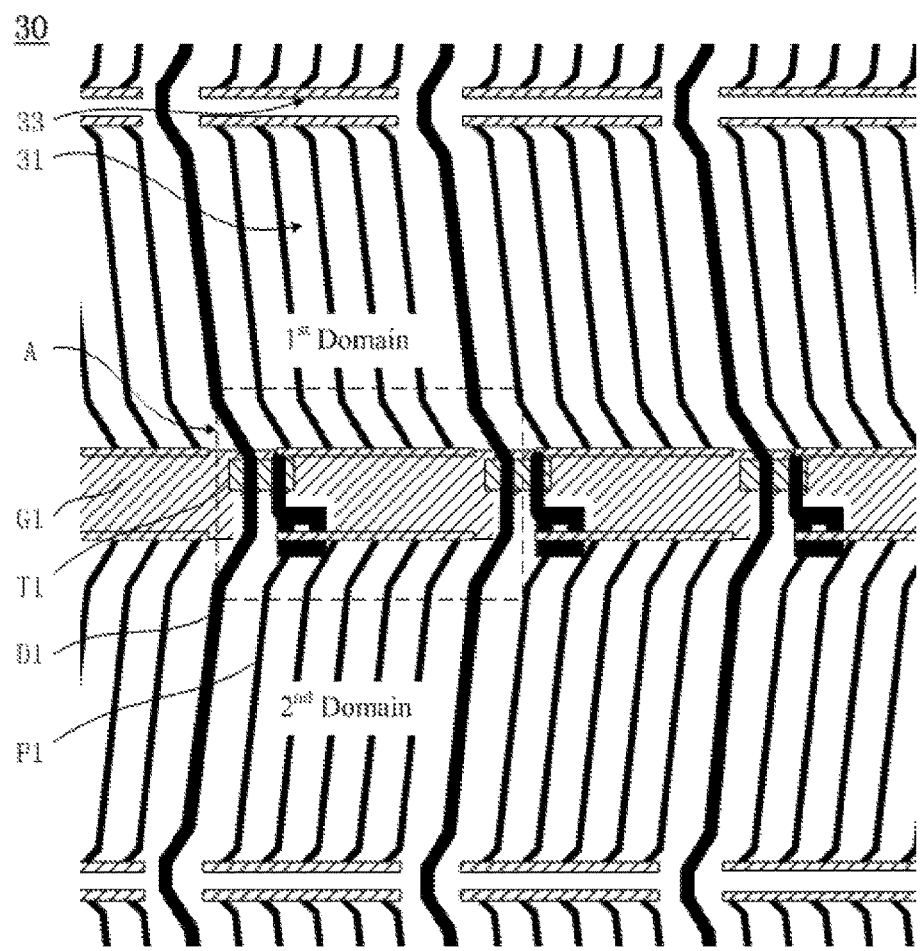
FIG. 3 is a diagram of a pixel structure of a LCD according to an exemplary embodiment.
Figure 4:
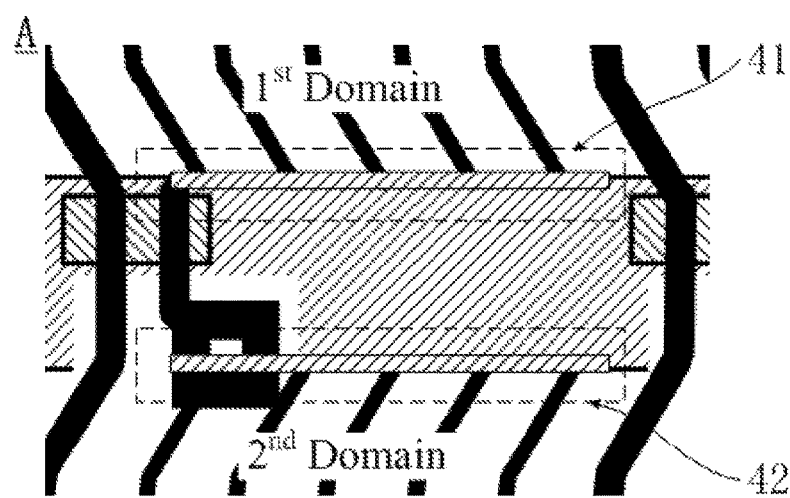
FIG. 4 is a scale-up diagram of the area A shown in FIG. 3.

Please refer to FIG. 3 and FIG. 4. FIG. 3 is a diagram of a pixel structure of a LCD according to an exemplary embodiment. FIG. 4 is a scale-up diagram of the area A shown in FIG. 3. Please note, this embodiment is more appropriate to be used in FFS/IPS LCD. The LCD 30 comprises a plurality of gate lines G1 extending horizontally and a plurality of data lines D1 extending vertically. The gate lines G1 and the data lines D1 intersect each other to form a matrix to define a plurality of pixel areas 31. Each pixel area 31 comprises a pixel structure. The pixel structure comprises a pixel electrode P1, a gate line G1, a data line D1 and a transistor T1. The pixel electrode comprises at least two display domains.

The pixel electrode P1 is located in the aperture of the pixel. The pixel electrode P1 comprises two display domain, the $1^{st}$ domain and the $2^{nd}$ domain, to prevent the LCD from being blue or yellow when it is viewed at a large view angle. The two display domains are vertically arranged (for example, one is in an upper place and the other one is a lower place).

The gate line G1 is located at the intersection of the two display domains ($1^{st}$ domain and $2^{nd}$ domain) and the edge of the intersection overlaps the gate line G1. That is, the aperture of the pixel is divided by the gate line G1 and the edge of the intersection (the dividing line of the aperture) of the display domains overlaps the gate line G1. As shown in FIG. 4, the lower edge 41 of the $1^{st}$ domain overlaps the gate line G1 and the upper edge 42 of the $2^{nd}$ domain overlaps the gate line G1. In other words, the region where the liquid crystal molecules rotate in different direction overlaps the gate line. Since the gate line is made by non-transparent metal material, it covers the dark line caused by the liquid crystal molecules at the intersection and thus raises the aperture rate and transparent rate of the LCD. Furthermore, because the region where the liquid crystal molecules rotating differently are covered by the gate lines, there would be no display error when the LCD panel is pushed. This also raises the display quality.

The data line D1 is located at the edge of the aperture of the pixel structure (as shown in FIG. 3, the data line D1 is located at the left side of the aperture). In this embodiment, because one pixel electrode only comprises one data line and the data line is located at the sides of the pixel electrode (for example, in this embodiment, the data line is located at the left side) instead of being in the middle of the pixel electrode, this prevents from increasing the parasite capacitance, raising the temperature of the driver IC, and decreasing the reliability due to the data line.

The pixel electrode P1 is controlled by the data line D1 and gate line G1 via the transistor T1. One pixel comprises only one TFT. The TFT merely occupies a small area and thus raises the aperture rate of the LCD panel.

In this embodiment, the pixel electrode P1 extends in different directions in the two display domains ($1^{st}$ domain and $2^{nd}$ domain). When the LCD works, the liquid crystal molecules in the two display domains respectively rotates clockwise and counterclockwise. This characteristic is used to improve the large view angle performance of the EFS LCD panel such that the LCD panel does not become blue or yellow when the LCD panel is viewed from its side. In this embodiment, the voltage levels of the two display domains of the pixel electrode P1 are the same.

Furthermore, in this embodiment, the area 33 between the two pixel areas is a blank area. However, in the actual implementation, the area 33 can comprises a common line to raise the flexibility of the layout.

Figure 5:
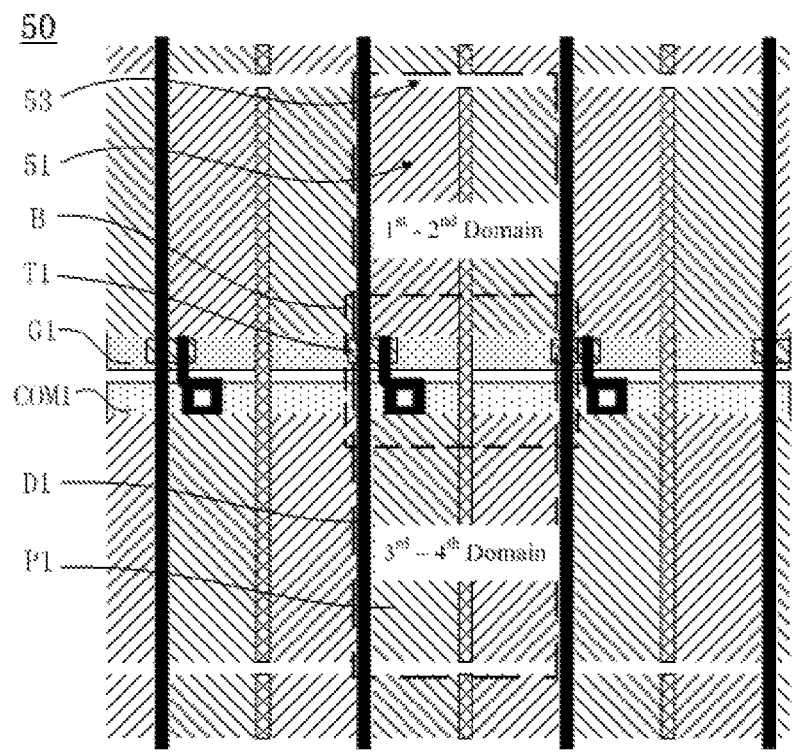
FIG. 5 is a diagram of a pixel structure of a LCD according to an exemplary embodiment.
Figure 6:
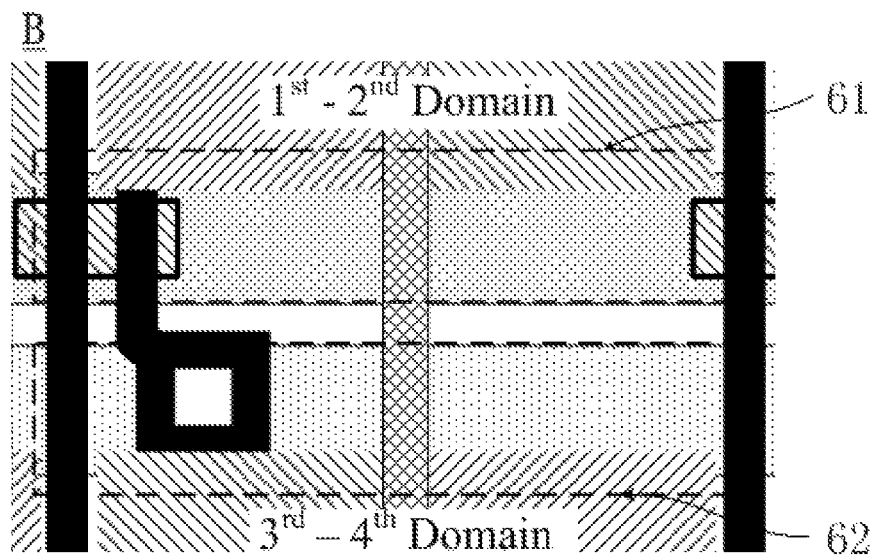
FIG. 6 is a scale-up diagram of the area B shown in FIG. 5.

Please refer to FIG. 5 and FIG. 6. FIG. 5 is a diagram of a pixel structure of a LCD according to an exemplary embodiment. FIG. 6 is a scale-up diagram of the area B shown in FIG. 5. Please note, this embodiment is more appropriate to be used in HVA LCD. The LCD 50 comprises a plurality of gate lines G1 extending horizontally and a plurality of data lines D1 extending vertically. The gate lines G1 and the data lines D1 intersect each other to form a matrix to define a plurality of pixel areas 51. Each pixel area 51 comprises a pixel structure. The pixel structure comprises a pixel electrode P1, a gate line G1, a common line COM1, a data line D1 and a transistor T1. The pixel electrode comprises at least four display domains.

The pixel electrode P1 is located in the aperture of the pixel. The pixel electrode P1 comprises four display domain, the $1^{st}$ domain, the $2^{nd}$ domain, the $3^{rd}$ domain, and the $4^{th}$ domain, to prevent the LCD from being blue or yellow when it is viewed at a large view angle. The $1^{st}$ and $2^{nd}$ domains are horizontally arranged (for example, one is in left of the other) and the $3^{rd}$ and $4^{th}$ domains are horizontally arranged.

The $1^{st}$ and $2^{nd}$ domains are located above the gate line G1 and the lower edge of the $1^{st}$ and $2^{nd}$ domains overlaps the gate line G1.

The $3^{rd}$ and $4^{th}$ domains are located under the common line COM1 and the upper edge of the $3^{rd}$ and $4^{th}$ domains overlap the common line COM1.

The aperture of the pixel is divided by the gate line G1 and the common line COM1 and the gate line G1 and the common line COM1 are located at the intersection of the $1^{st}$ and $2^{nd}$ domains and the $3^{rd}$ and $4^{th}$ domains. Furthermore, the edges of the intersection overlaps the gate line G1 and the common line COM1. In this way, the regions where the liquid crystal molecules differently rotate overlap the gate line or the common line. Furthermore, the gate line and the common line are made by non-transparent metal material. Therefore, the dark line is covered by the gate line and the common line and does not exist in the aperture. Thus the aperture rate and the transparent rate are raised. In addition, because the regions where the liquid crystal molecules rotating differently are covered by the gate lines, there would be no display error when the LCD panel is pushed. This also raises the display quality.

In an exemplary embodiment, the pixel structure may comprise a pixel electrode P1, a gate line G1, a data line D1 and a transistor T1. The pixel electrode P1 comprises at least four display domains. The $1^{st}$ domain and the $2^{nd}$ domain are located above the gate line G1 and the lower edge of the $1^{st}$ domain and the $2^{nd}$ domain overlaps the gate line G1. In addition, the $3^{rd}$ domain and the $4^{th}$ domain are located under the gate line G1 and the upper edge of the $3^{rd}$ domain and the $4^{th}$ domain overlaps the gate line G1. That is, the aperture of the pixel is divided by the gate line G1 and the gate line G1 is located at the intersection of the $1^{st}$ domain and the $2^{nd}$ domain and the $3^{rd}$ domain and the $4^{th}$ domain. The edges of the intersection overlap the gate line G1. In this way, the regions where the liquid crystal molecules differently rotate overlap the gate line. Therefore, the dark line is covered by the gate line and does not exist in the aperture. Thus the aperture rate and the transparent rate are raised. In addition, because the regions where the liquid crystal molecules rotating differently are covered by the gate line, there would be no display error when the LCD panel is pushed. This also raises the display quality.

The data line D1 is located at the edge of the aperture of the pixel (as shown in FIG. 5, the data line D1 is located at the left side of the aperture of the pixel). In this embodiment, one pixel electrode comprises only one data line. The data line D1 is located at the sides (in this embodiment, the data line is at the left side) instead of being in the middle of the pixel electrode. This prevents from increasing the parasite capacitance, raising the temperature of the driver IC, and decreasing the reliability due to the data line.

The pixel electrode P1 is controlled by the data line D1 and gate line G1 via the transistor T1. One pixel comprises only one TFT. The TFT merely occupies a small area and thus raises the aperture rate of the LCD panel.

In this embodiment, the pixel electrode P1 extends in different directions in the four display domains ($1^{st}$-$4^{th}$ domains). The liquid crystal molecules of the $1^{st}$ domain rotate 45 degrees from the data line D1. The liquid crystal molecules of the $2^{nd}$ domain rotate 135 degrees from the data line D1. The liquid crystal molecules of the $3^{rd}$ domain rotate 225 degrees from the data line D1. The liquid crystal molecules of the $4^{th}$ domain rotate 135 degrees from the data line D1. This characteristic is used to improve the large view angle performance of the HVA LCD panel such that the LCD panel does not become blue or yellow when the LCD panel is viewed from its side. In this embodiment, the four display domains of the pixel electrode P1 have the same voltage level.

Furthermore, in this embodiment, the area 53 between the two pixel areas is a blank area. However, in the actual implementation, the area 53 can comprises a common line to raise the flexibility of the layout.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A liquid crystal pixel structure comprising:
 a pixel electrode, located in a pixel aperture, the pixel electrode comprising at least four display domains, wherein a first display domain and a second display domain of the at least four display domains are horizontally arranged, a third display domain and a fourth display domain of the at least four display domains are horizontally arranged, and the at least four display domains have a same voltage level;
 a gate line, wherein the first display domain and the second display domain are arranged above the gate line, lower edges of the first display domain and the second display domain overlap the gate line, the third display domain and the fourth display domain are arranged under the gate line, and an upper edge of the third display domain and the fourth display domain overlaps the gate line;
 a data line, located at an edge of the pixel aperture;
 a transistor, wherein the pixel electrode is controlled by the gate line and the data line via the transistor;
 wherein liquid crystal molecules of the first display domain, the second display domain, the third display domain, the fourth display domain respectively rotate 45 degrees, 135 degrees, 225 degrees, and 315 degrees from the data line; and
 a common line, wherein the first display domain and the second display domain are arranged above the gate line, the lower edges of the first display domain and the second display domain overlaps the gate line, the third display domain and the fourth display domain are arranged under the common line, and upper edges of the third display domain and the fourth display domain overlap the common line.

2. A liquid crystal pixel structure comprising:
 a pixel electrode, located in a pixel aperture, the pixel electrode comprising at least four display domains, wherein a first display domain and a second display domain of the at least four display domains are horizontally arranged, a third display domain and a fourth display domain of the at least four display domains are horizontally arranged;
 a gate line, wherein the first display domain and the second display domain are arranged above the gate line, lower edges of the first display domain and the second display domain overlap the gate line, the third display domain and the fourth display domain are arranged under the gate line, and an upper edge of the third display domain and the fourth display domain overlaps the gate line;
a data line, located at an edge of the pixel aperture;
a transistor, wherein the pixel electrode is controlled by the gate line and the data line via the transistor; and
a common line, wherein the first display domain and the second display domain are arranged above the gate line, the lower edges of the first display domain and the second display domain overlaps the gate line; the third display domain and the fourth display domain are arranged under the common line, and upper edges of the third display domain and the fourth display domain overlap the common line.

* * * * *